United States Patent [19]

Godbersen

[11] 3,968,940
[45] July 13, 1976

[54] APPARATUS FOR HANDLING BALES

[76] Inventor: Byron L. Godbersen, 710 Circle Drive, Ida Grove, Iowa 51445

[22] Filed: July 10, 1974

[21] Appl. No.: 487,244

[52] U.S. Cl. ........................... 242/86.5 R; 214/653; 214/766; 214/DIG. 4; 242/65
[51] Int. Cl.² ................. B65H 17/06; B65H 75/42
[58] Field of Search ............ 242/86.5 R, 58.6, 75.1, 242/65, 86.52; 214/147 G, 653, 766, DIG. 4

[56] References Cited
UNITED STATES PATENTS

| | | | |
|---|---|---|---|
| 1,364,383 | 1/1921 | King | 214/1 QB |
| 1,796,912 | 3/1931 | Wood | 242/75.1 |
| 2,616,637 | 11/1952 | Schroeml | 242/86.5 R |
| 2,954,886 | 10/1960 | Nelson | 214/147 G |
| 3,048,348 | 8/1962 | Griffin | 242/86.5 R |
| 3,052,366 | 9/1962 | Duncan | 214/147 G |
| 3,400,542 | 9/1968 | Davis | 242/75.1 X |
| 3,677,428 | 7/1972 | Mallett | 214/147 G |
| 3,861,616 | 1/1975 | Dubberke | 242/86.5 R |

*Primary Examiner*—Billy J. Wilhite
*Assistant Examiner*—John M. Jillions
*Attorney, Agent, or Firm*—Henderson, Strom & Sturm

[57] ABSTRACT

An apparatus for handling bales having the capability to engage, lift, transport and feed bales of hay. A frame is adapted to be connected to a three-point hitch of a tractor. Pivotally connected to the frame along an axis substantially parallel to the direction of movement of the tractor is a first substantially L-shaped member. A first bale arm is pivotally attached to the first member and has a rotatable hub attached at the lower end thereof for engaging one end of a bale. A second bale arm is pivotally attached to the first bale arm and has a hub rotatably attached to the lower end thereof for engaging the other end of a bale. A mechanism for pivoting the second bale arm with respect to the first bale arm allows a bale to be engaged by the hubs without the need for the operator of the apparatus to dismount from the tractor. A rotatable member is disposed on the lower end of the first member and has a mechanism for selectively causing rotation thereof. Additionally, a mechanism for pivoting the first member also causes the rotatable member to engage and rotate a bale disposed on the hubs. Further pivoting of the first member allows movement of the first and second bale arms between a vertical position directly behind the tractor to a substantially horizontal position, whereby bale can be moved between a position directly behind the tractor to position behind and to one side of the tractor, with the longitudinal axis of the bale being substantially aligned with the direction of movement of the tractor at all times.

18 Claims, 13 Drawing Figures

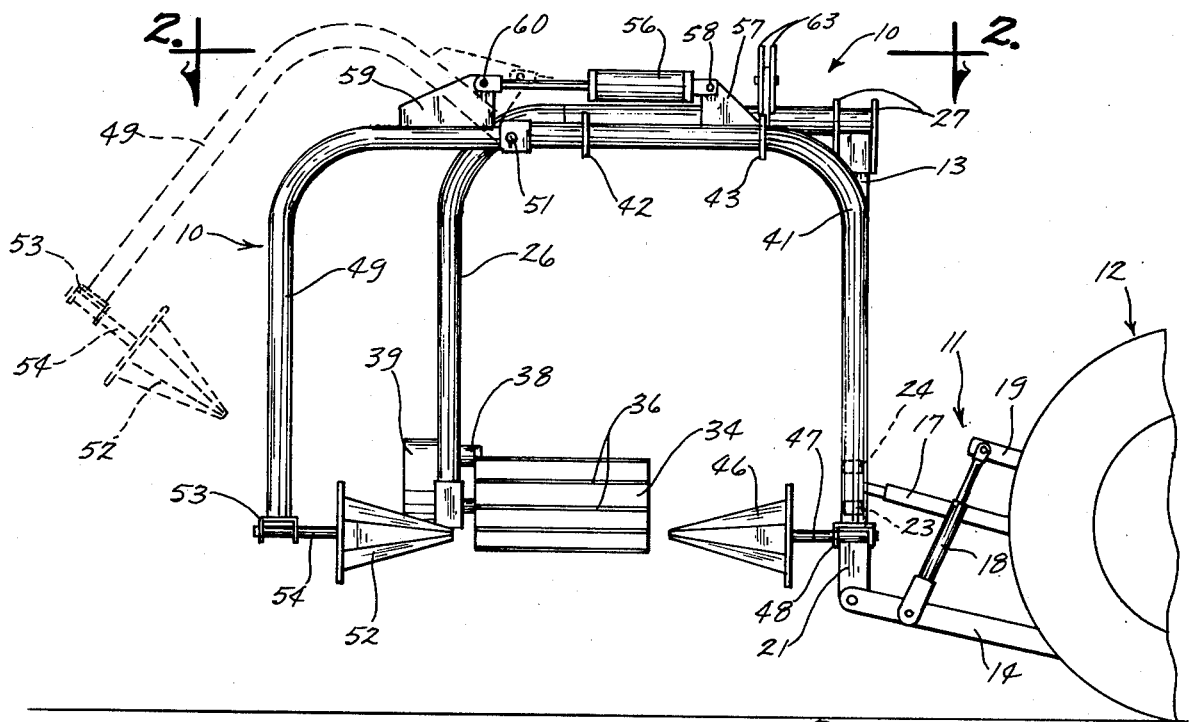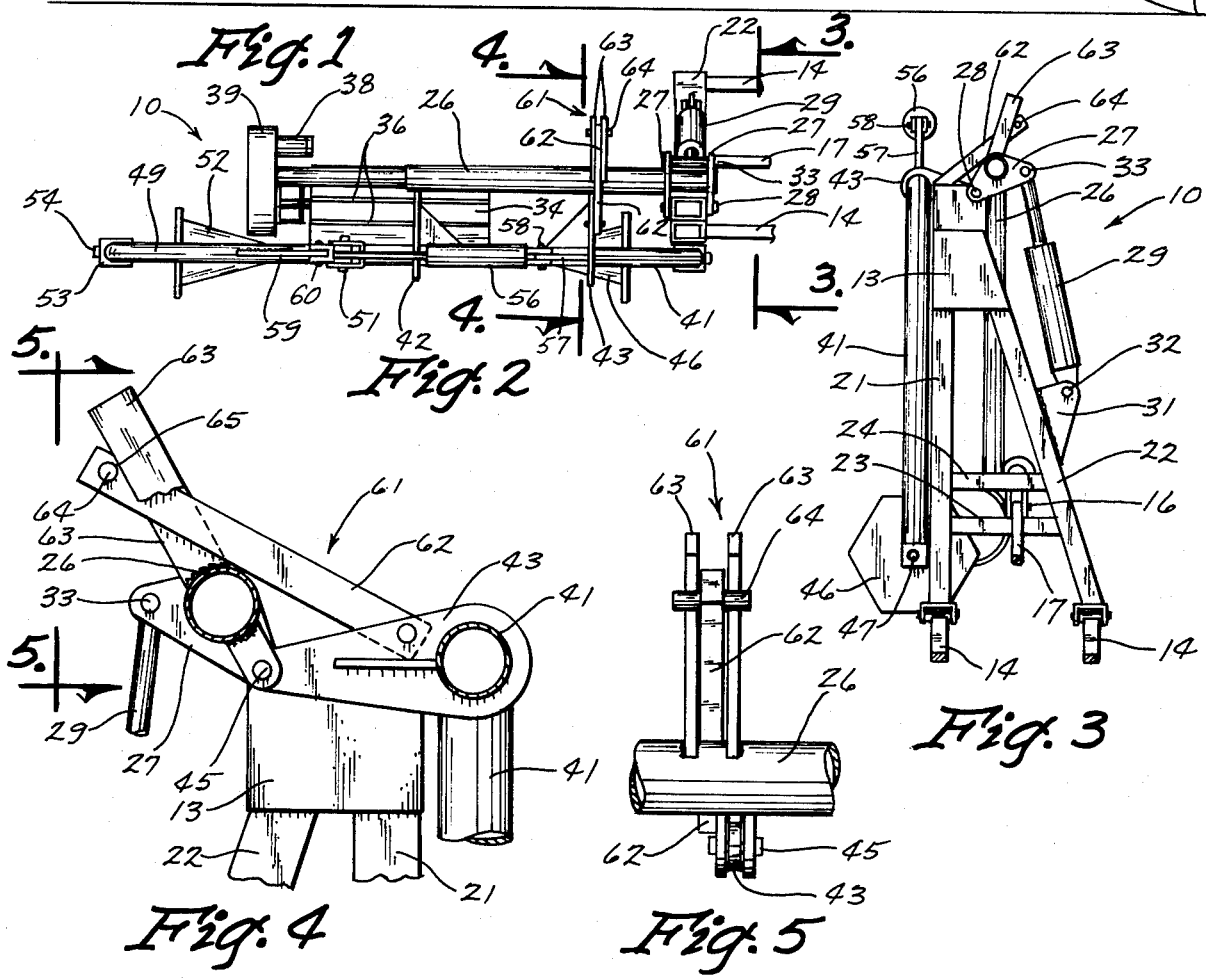

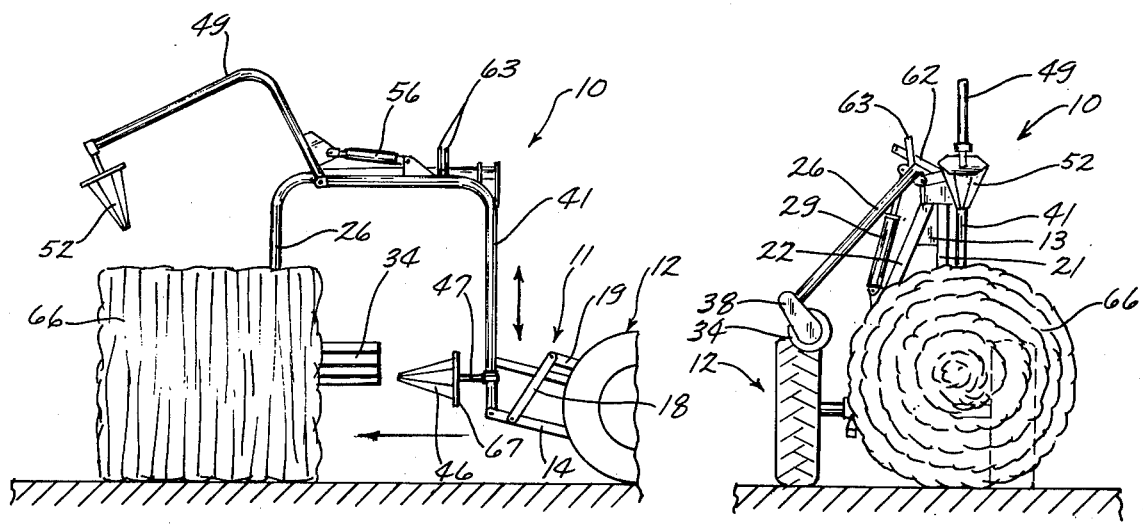
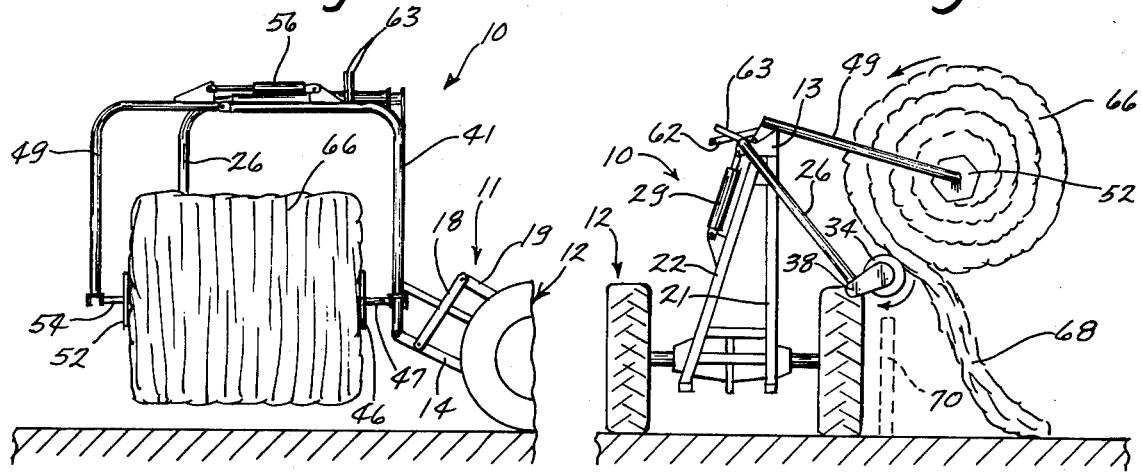
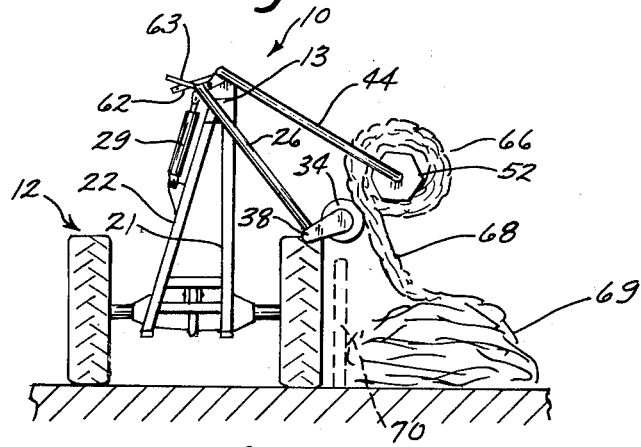

APPARATUS FOR HANDLING BALES

BACKGROUND OF THE INVENTION

With the advent of hay balers making bales weighing over 1,000 pounds each, rather than the previously common bale size of 50 to 150 pounds, a need was created for equipment to handle these larger bales. These large bales are normally of a cylindrical configuration, and are formed by first forming a windrow, and then rolling up and packing the windrow into a large bale.

While there are many distinct advantages of having a few large bales rather than a multitude of smaller bales, there are certain problems involved in handling and using the larger bales. For example, whereas a smaller bale could be placed by hand on a truck or trailer for transportation to a feeding site, the larger bales are simply too heavy and bulky for such manual handling. Likewise, the smaller bales could normally be broken open or unrolled easily by hand and therefore easily fed to livestock, such as cattle. Conversely, the larger bales are quite difficult to feed to livestock by hand.

The larger bales can be lifted and transported on fork lift types of devices on the front or the back of a tractor such as disclosed in U.S. Pat. No. 2,999,608. U.S. Pat. No. 3,779,208 is an example of a prior art device which is capable of transporting large bales and unrolling these bales along the ground.

It has therefore been shown that there is an existing need for a device for engaging, lifting, transporting and feeding or unwinding bales of material such as large round bales of hay, and especially needed is a device which performs all of these functions without the necessity of the operator having to dismount the tractor to perform portions of the needed process. Another serious problem when using these large bales is the one of how to move the bale from one side of a fence to the other without damaging the fence. In other words, there is a need to be able to have a tractor on one side of a fence or enclosure and to be able to unroll or feed the hay in the bale into another enclosure or across a fence or to simply move a large bale from one side of a fence to another without the necessity of driving the bale transporting device through a gate to the other side of the fence. While the small bales of hay could be thrown into a feed bunk and then broken open, or thrown over a fence and then broken open or unrolled manually, this simply is not possible, or at least is not practical to do with bales which weigh as much as 1,200 pounds.

SUMMARY OF THE INVENTION

The present invention relates to an apparatus for engaging, lifting, transporting and feeding or unwinding bales of material, especially round bales of hay. A bale engaging apparatus serves to grasp a bale upon each end thereof. Upward movement of a tractor three-point hitch allows the bale to be lifted off of the ground to a transport position and conversely back to the ground, if desired. A mechanism is provided for rotating the bale, to thereby cause the bale to unroll and thereby deposit all of the bale, or just the outermost layers of the bale, upon a surface below such as on the ground or in a feed bunk. Additionally, means are provided for holding the bale out toward one side of the tractor while unrolling the bale, so that the hay can be deposited into a feed bunk from outside of the feedbunk or over and across a fence.

An object of the present invention is to provide a device for engaging and lifting bales.

Another object of the invention is to provide a device for transporting bales.

A further object of the invention is to provide a device for unrolling and feeding bales which have been formed by rolling up a windrow, so as to re-form the windrow.

Still another object is to provide a bale handling apparatus on a tractor which is capable of unrolling a bale on one side of a feed bunk or fence when the tractor to which the apparatus is mounted is located on the opposite side of the fence or feed bunk.

Still another object of the present invention is to provide an apparatus which will perform all of the functions noted above such as engaging and lifting a bale to a transportation position, moving the bale to a feeding position and unrolling the bale to reform the windrow, in a single device which is operable without the necessity of the operator having to get off the tractor.

Other objects, advantages, and novel features of the present invention will become apparent from the following detailed description of the invention when considered in conjunction with the accompanying drawings.

BRIEF DESCRIPTION OF THE DRAWINGS

FIG. 1 is a side elevation view of the present invention, looking at the right side of the device;

FIG. 2 is a top view of the present invention taken along line 2—2 of FIG. 1;

FIG. 3 is a front view of the invention taken along line 3—3 of FIG. 2;

FIG. 4 is a detailed view of the stop mechanism taken along line 4—4 of FIG. 2;

FIG. 5 is a detailed view of the stop mechanism taken along line 5—5 of FIG. 4;

FIG. 9 is a right side elevational view of the present invention showing it in a position ready to engage a bale;

FIG. 10 is a rear view of the invention similar to that shown in FIG. 9 but with the front of the device engaging the center of the bale;

FIG. 11 is a right side elevational view of the present invention in a bale engaging position and with the three-point hitch shown lifting the device;

FIG. 12 is a rear view of the present invention showing the bale lifted to one side and in the process of being unrolled;

FIG. 13 is a rear view similar to FIG. 12 but showing the bale being nearly completely unrolled.

DESCRIPTION OF THE PREFERRED EMBODIMENT

Figure 6:
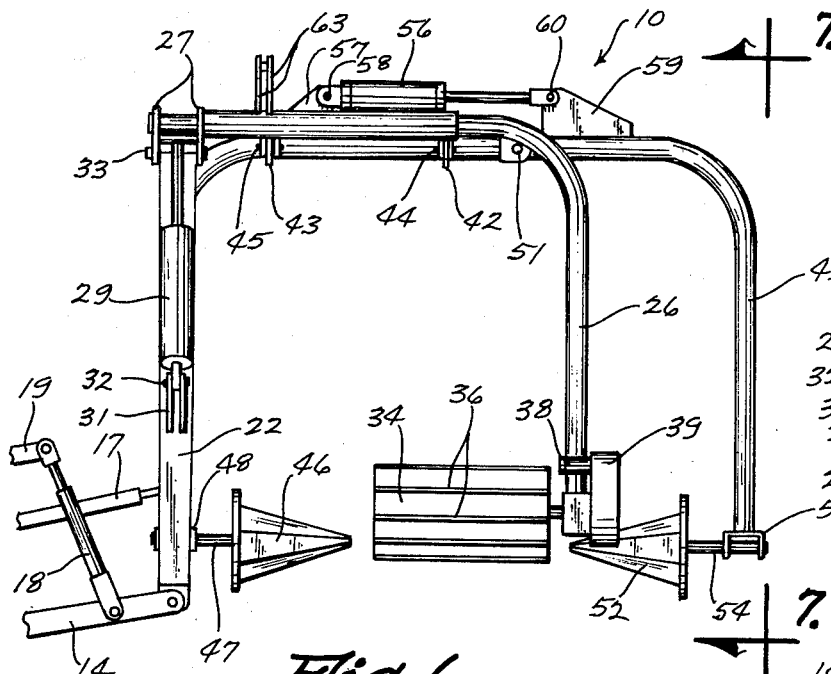
FIG. 6 is a side elevation view of the present invention, showing the left side of the device.

Referring now to the drawings, wherein like reference numerals designate identical or corresponding parts throughout the several views and more particularly to FIG. 1 which shows a preferred embodiment of the invention to a bale handling device 10 being connected to a three-point hitch 11 of a tractor 12. A frame 13 is connected to the three-point hitch 11 of the tractor 12, by a pivotal connection at the ends of draft arms 14 (FIG. 3). Additionally, the third point of the three-point hitch is accomplished by the pivot 16 at one end of a member 17. The member 17 of the three-point hitch 11 has one portion thereof slideably extended within the other portion thereof and consequently is adjustable in length as needed. Member 18 of the tractor three-point hitch is pivotally mounted to the draft arms 14 at one end thereof and is also pivotally mounted to a member 19 on the other end thereof. The member 19 is controlled by a tractor mounted control (not shown) by which the operator on the tractor 12 can raise or lower the three-point hitch mechanism and thereby raise or lower the bale handling apparatus 10 as a whole.

The frame 13 is of a slanted A configuration with one brace 21 being of a straight vertical configuration and another brace 22 being slanted with respect to the vertical. Two central braces 23 and 24 serve as a mounting for pivot 16. The braces 21 and 22 are connected at the top thereof by a plate which forms the top of the slanted A of the frame 13. The reason for this particular configuration will be explained below.

A first L-shaped member 26 is solidly affixed to a pair of mounting brackets 27 (See FIGS. 1, 3 and 6), which mounting brackets are pivotally connected to the frame 13 at the pivotal point 28 (FIG. 3). A hydraulic cylinder 29 (FIG. 3) is pivotally attached to the leg 22 of the brace 13 through a plate 31 at pivotal point 32. The other end of the hydraulic cylinder 29 is pivotally attached to the mounting brackets 27 at pivotal point 33. The hoses and the hydraulic controls for cylinder 29 are not shown, but it is to be understood that the hoses lead to the tractor and the controls therefor are placed within easy access to the tractor operator.

At the other extreme end of the first L-shaped member 26 is rotatably disposed a drum 34 having longitudinally extending parallel ridges 36 disposed along the periphery thereof. The rotatable connection is accomplished by a shaft 37 which is rotated by a hydraulic motor 38 connected to the other end of the first L-shaped member 26. Hydraulic hoses leading from the tractor to the hydraulic motor 38 extend through the center of first member 26 along the entire length of member 26. A chain drive for gearing mechanism 39 connects the hydraulic motor 38 to the rotatable drum 34. It is to be understood that other means may obviously be used to rotate the drum 34, such as by using an electrical motor in place of the hydraulic motor 38. The motor 38 moves the drum 34 in a direction as shown by the arrow in FIG. 12, to thereby rotate the bale 66 in the opposite direction.

Also pivotally connected to the first L-shaped member 26 is a first bale arm 41. This pivotal connection of the first bale arm 41 to the first L-shaped member 26 is accomplished through brackets 42 and 43 (FIGS. 1, 2 and 6) which are rigidly attached to the first bale arm 41 such as by welding, and are pivotally attached at pivotal points 44 and 45 respectively to the first L-shaped member 26 (FIG. 6). At the bottom end of the first bale arm 41 is rotatably disposed a first hub 46 which is of a pyramidal configuration, with the axis of rotation thereof being along the central longitudinal axis of the pyramid and extending through the apex thereof. The rod 47 which forms the axis of the first hub 46 is disposed along this longitudinal axis and the pivotal connection is mounted to the first bale arm 41 by the bracket 48, which is connected to the bottom end of the first bale arm 41.

Connected to the other end of the first bale arm 41 is a second bale arm 49. The second bale arm 49 is pivotally attached to the first bale arm 41 at the pivotal connection 51. At the opposite end of the second bale arm 41 is rotatably disposed a second hub 52 which, like the first hub 46 is a pyramidal shape and with an identical mounting bracket 53 for rotatably mounting the shaft 54 of the second hub 52 in the same manner that shaft 47 and first hub member 46 are rotatably mounted. It will be understood by those skilled in the art that a fully equivalent structure to that discussed immediately above would be that the first hub 46 and the second hub 52 could rotate about the shafts 47 and 54 respectively and that these shafts 47 and 54 could be then solidly affixed to the first bale arm 41 and the second bale arm 49 respectively. Other equivalent structures, of course, suggest themselves to those skilled in the art. It is also to be understood that the instant device will operate without the hubs 46 and 52, but that their inclusion enhances the operability and performance of the bale handling apparatus.

A hydraulic cylinder 56 (FIG. 1) controls the pivoting the second bale arm 49 with respect to the first bale arm 41. The mounting for the hydraulic cylinder 56 is accomplished by a plate 57 secured to the first bale arm 41, to which one end of the hydraulic cylinder 56 is pivotally attached at pivotal point 58. Another plate 59 is secured, such as by welding, to the second bale arm 49 and is pivotally attached to the other end of the hydraulic cylinder 56 by a pivotal connection 60. It is again to be understood that, similarly to the connection of the hydraulic cylinder 29, the hoses to the hydraulic cylinder 56, though not shown, lead to the controls therefor which are mounted upon the tractor for convenience.

Referring now particularly to FIGS. 4 and 5, it can be seen that a stop mechanism 61 allows lost motion between the first L-shaped member 26 and the first bale arm 41. A bar 62 is pivotally attached to the bracket 43, which is, in turn, secured to the first bale arm 41. A pair of rods or bars 63 are solidly affixed, such as by welding, to the first L-shaped member 26, and the bar 62 extends therebetween. A stop pin 64 extends through the end of the bar 62 and is secured thereto. The bar 62 is received through the rods or bars 63. As best shown in FIG. 4, while the first bale arm 43 may pivot in a counterclockwise fashion around pivotal point 45 with respect to the first L-shaped member 26 as shown in FIG. 4, the first bale arm may not rotate in a clockwise fashion beyond the approximate point shown in FIG. 4 because of the stop pin 64 abuts the bars 63 at approximately point 65.

Referring now to FIGS. 9–13, the operation of the bale handling apparatus 10 will be explained. A bale 66 is first examined briefly to determine in which direction if has been rolled up, in order to determine which direction it must be turned in order to unroll the bale 66. An operator who is sitting on the tractor when it is in the position shown in FIG. 9 is in a correct position with respect to bale 66 once he has determined that rotation of the bale 66 in a clockwise position (as observed from his advantage point) would unroll the bale 66. Once this correct relationship has been observed, the three-point hitch control on the tractor is adjusted such that the rotatable axis of the hub 46 is substantially aligned with the longitudinal axis of the bale 66. Once this alignment has been made, the tractor 12 is then backed up until the hub 46 is engaged up to the shoulder 67 on the hub 46. Once this has been done, for example as shown in FIG. 10, the control for hydraulic cylinder 56 is actuated such that the cylinder is lengthened and the hub 52 is forced into the other end of the bale 66 along the longitudinal axis thereof to the same extent that hub 46 was forced into the other end of bale 66. The three-point hitch mechanism is then raised by actuating the controls that lift the arms 19, thereby lifting the bale 66 up off the ground as best shown in FIG. 11. At that point, the control for the hydraulic cylinder 29 is actuated to shorten the effective length of the hydraulic cylinder 29 and thereby force the first member 26 in a counterclockwise direction about the pivotal point 28 as viewed from the rear of the tractor in FIG. 12. This causes the rotatable drum 34 to force the bale 66, the hubs 46 and 52 and the first and second bale arms 41 and 49 upwardly as shown in FIG. 12. The tractor may then be driven to a position where the bale extends over a fence or feed bunk 70 as shown in FIGS. 12 and 13. At that point in time, the control is actuated for the hydraulic motor 38 to rotate the drum 34 in a clockwise direction as viewed in FIG. 12 from the rear of the device 10, and which in turn rotates the bale 66 and also the drums 41 and 49 in a counterclockwise position as viewed from the rear of the device in FIGS. 12 and 13, noting that the directions would appear reversed to an operator sitting on the tractor and looking backwardly at the motion. The tractor may then be moved forward while the bale 66 is being rotated and unrolled, as shown by the portion 68 which is falling to the ground. The tractor, in moving forward at the same time that the bale 66 is being unwound, will substantially re-form the windrow which existed just before the bale was originally made, if the speed of the tractor is approximately correct. This allows the hay to be fed in a long row. If all that is desired is that a loose stack of hay be formed, then the tractor can remain in one position and the bale 66 unrolled into a pile such as shown by the pile of hay 69 in FIG. 13. It is to be understood that the instant invention unpacks the hay and fluffs it up so that it may be eaten with a minimum of difficulty by cattle or other animals.

Figure 7:
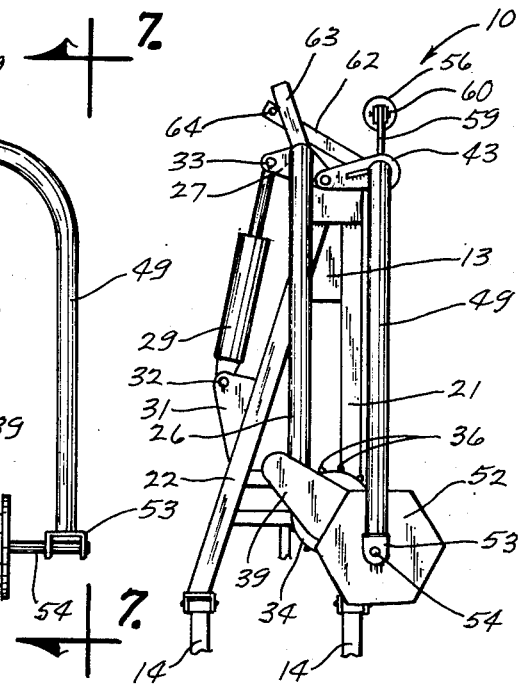
FIG. 7 is a rear view of the present invention taken along line 7—7 of FIG. 6.
Figure 8:
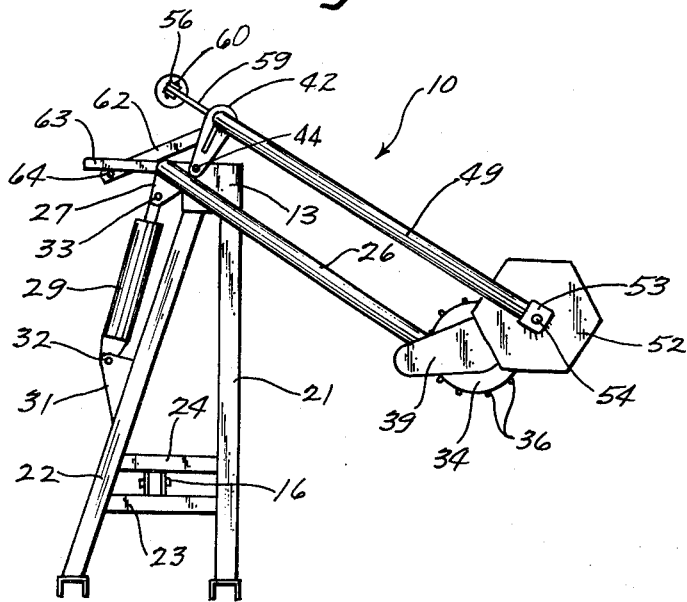
FIG. 8 is a rear view of the present invention similar to that of FIG. 7 but showing another position of the device.

Once the bale 66 is entirely unrolled, the first and second bale arms 41 and 49, including the attached structure thereto would have a tendency to immediately fall to a vertical position, thereby possibly striking the fence 70 or feed bunk fence 70, because of the lost motion between the first arm member 26 and the first and second bale arms 41 and 49. This does not happen, however, because of the provision of stop mechanism 64 (FIGS. 4 and 5) which abuts the bars 63 and thereby holds the first and second bale arms 41 and 49 in the position shown in FIG. 8 until the tractor is moved away from the fence or feed bunk and at such time that the operator wishes to lower the first member 26 and the first and second bale arms 41 and 49 to the position shown in FIG. 7. Movement of the first L-shaped member 26 and the first and second bale arms 41 and 49 from the position shown in FIG. 8 to the position shown in FIG. 7 is effectuated by actuation of the hydraulic cylinder 29 to thereby lengthen such and cause the desired rotation.

It is noted that the frame 13 has a novel slanted A configuration so that the bale 66 can be extended farther to one side than would be necessary if a straight A configuration was used. Consequently the straight and vertical brace 21 is positioned on the side to which it is desired that the bale will be extended.

It is also noted that the grasping mechanism, including first and second bale arms 41 and 49 respectively and their respective hubs 46 and 52, can be used independently of the aspect of this invention to the first L-shaped member 26 and the means for rotating the bale 34. This is to say that the hydraulic cylinder 56 and the bale arms 41 and 49 can be used to grasp and lift, and consequently transport, a bale without the provision of the rotating means.

Conversely, if the first and second bale arms 41 and 49 were not pivotally attached with respect to each other, they could still be used to rotatably mount the bale 66 by inserting the hubs 46 and 52 or by such a procedure as merely running a shaft through the bale at its central axis. The bale rotating mechanism including the rotatable drum 34 could then be used to rotate and unroll the bale 66 independently of the manner in which the bale has been attached to the apparatus 10. While it is noted that these two aspects of the invention can be used independently, it is also noted that the bale handling apparatus 10 has combined these aspects to form an apparatus which is versatile enough to be able to engage, lift, transport and feed or unroll bales of hay or other materials with such ease as has not been heretofore achieveable.

Obviously many modifications and variations of the present invention are possible in light of the above teachings. For example, while the present invention is primarily designed for unrolling large bales of hay, it is to be understood that a bale is to be defined as a roll or package of any kind of material. Additionally, many different methods of using the disclosed invention will be noted by those skilled in the art. It is therefore to be understood, that within the scope of the appended claims, the invention may be practiced otherwise than as specifically described.

I claim:

1. An apparatus for handling bales comprising:
   frame means for attachment to a tractor;
   a first member pivotally mounted to said frame means;
   pivoting means connected to said first member for pivoting said first member with respect to said frame means;
   a first bale arm pivotally mounted to said first member;
   a first hub attached to said first bale arm;
   a second bale arm pivotally mounted to said first bale arm;
   a second hub attached to said second bale arm;
   means for pivoting said second bale arm with respect to said first bale arm; and
   rotatable means mounted on said first member to engage and rotate a substantially round bale attached to said hubs.

2. An apparatus for handling bales as defined in claim 1 wherein said rotatable means comprises:
   a drum means rotatably mounted to said first member; and
   power means for rotating said drum means.

3. An apparatus for handling bales as defined in claim 2 wherein said drum means is mounted along an axis parallel to the axis of said first hub.

4. An apparatus for handling bales as defined in claim 3 wherein said drum means is mounted substantially intermediate the first and second hubs.

5. An apparatus for handling bales as defined in claim 2 wherein said power means includes a hydraulic motor having a hydraulic hose for the hydraulic motor extending through the center of said first member.

6. An apparatus for handling bales as defined in claim 2 wherein said drum means is substantially cylindrical in shape with longitudinal ribs disposed on the outer periphery thereof.

7. An apparatus for handling bales as defined in claim 1 having means for pivoting said first member in a direction towards said first and second bale arms.

8. An apparatus for handling bales as defined in claim 7 having means for causing said first and second bale arms to pivot when said first member is pivoted.

9. An apparatus for handling bales as defined in claim 1 wherein said hubs are rotatably mounted.

10. An apparatus for handling bales as defined in claim 9 wherein said hubs are of a pyramidal configuration and the axis of rotation extends through the apex of the pyramid.

11. An apparatus for handling bales as defined in claim 8 having means for allowing pivotal lost motion between the first member and the first and second bale arms; and
    stop means for preventing said first member from pivoting past said first and second bale arms.

12. An apparatus for handling bales as defined in claim 1 wherein the pivotal axis of said first member is aligned with the direction of movement of a tractor.

13. An apparatus for handling bales as defined in claim 1 wherein the pivotal axis of said first member is parallel with a line defining the front and rear of said tractor.

14. An apparatus for handling bales as defined in claim 1 including means for connecting the frame means to a three-point hitch of a tractor.

15. An apparatus for handling bales as defined in claim 1 wherein said frame means comprises a vertical support on one side thereof and a slanted support on the other side thereof; the slanted support and the vertical support being connected at the top ends thereof.

16. An apparatus for handling bales as defined in claim 15 wherein said first member and said first and second arms have a first vertical position and a second position to one side of the pivotal axes thereof.

17. An apparatus for handling bales as defined in claim 16 wherein said vertical support is on the same side as said hubs when the arms are in the second position pivoted to one side.

18. An apparatus for attachment to the three-point hitch of a tractor for handling round bales comprising:
    frame means adapted to be connected to the hitch for vertical movement thereby;
    first means secured to the frame means and extended rearwardly therefrom, said first means including a rotatable drum the axis of rotation of which extends parallel to the direction of movement of the tractor;
    second means mounted on said first means for movement laterally thereof, said second means including a first arm pivotally mounted on said first means, and a second arm pivotally connected to said first arm, each of said pivotally connected arms having a hub rotatably mounted thereon;
    means mounted on said second means for pivotally moving said second arm from a first position wherein said hubs are axially aligned for holding a bale therebetween in engagement with said drum, to a second position wherein said second arm and its hub are spaced upwardly and away from the other arm and hub; and
    means for axially rotating said drum to unroll the bale completely until it is gone from between said hubs, said second means freely movable toward said first means as the bale is unrolled.

* * * * *